United States Patent

[11] 3,551,600

[72] Inventor William H. Berch
Penfield, N.Y.

[21] Appl. No. 707,603
[22] Filed Feb. 23, 1968
[45] Patented Dec. 29, 1970
[73] Assignee Stromberg-Carlson Corporation
Rochester, N.Y.
a corporation of Delaware

[54] HIGH CAPACITY, HIGH SIDE-TONE SUPPRESSION, 4-WIRE CONFERENCE CIRCUIT
12 Claims, 2 Drawing Figs.

[52] U.S. Cl. .......... 179/18, 179/15
[51] Int. Cl. .......... H04m 3/56
[50] Field of Search .......... 179/1SAT, 18.01, 1CONF(Cursory)

[56] References Cited
UNITED STATES PATENTS

| | | | |
|---|---|---|---|
| 3,293,369 | 12/1966 | Schroeder | 179/18 |
| 3,395,254 | 7/1968 | Sweet | 179/18 |
| 3,399,275 | 8/1968 | Niertit et al. | 179/1 |

*Primary Examiner*—Kathleen H. Claffy
*Assistant Examiner*—David L. Stewart
*Attorney*—Charles C. Krawczyk

ABSTRACT: Conference circuit for time division multiplex communication systems in which the output of each line circuit is converted to digital form and summed during each time frame. The sum of the outputs less the contribution of the respective line circuit is then reconverted to analog form and applied during each time slot to said line circuits in a subsequent time frame.

Figure 1:
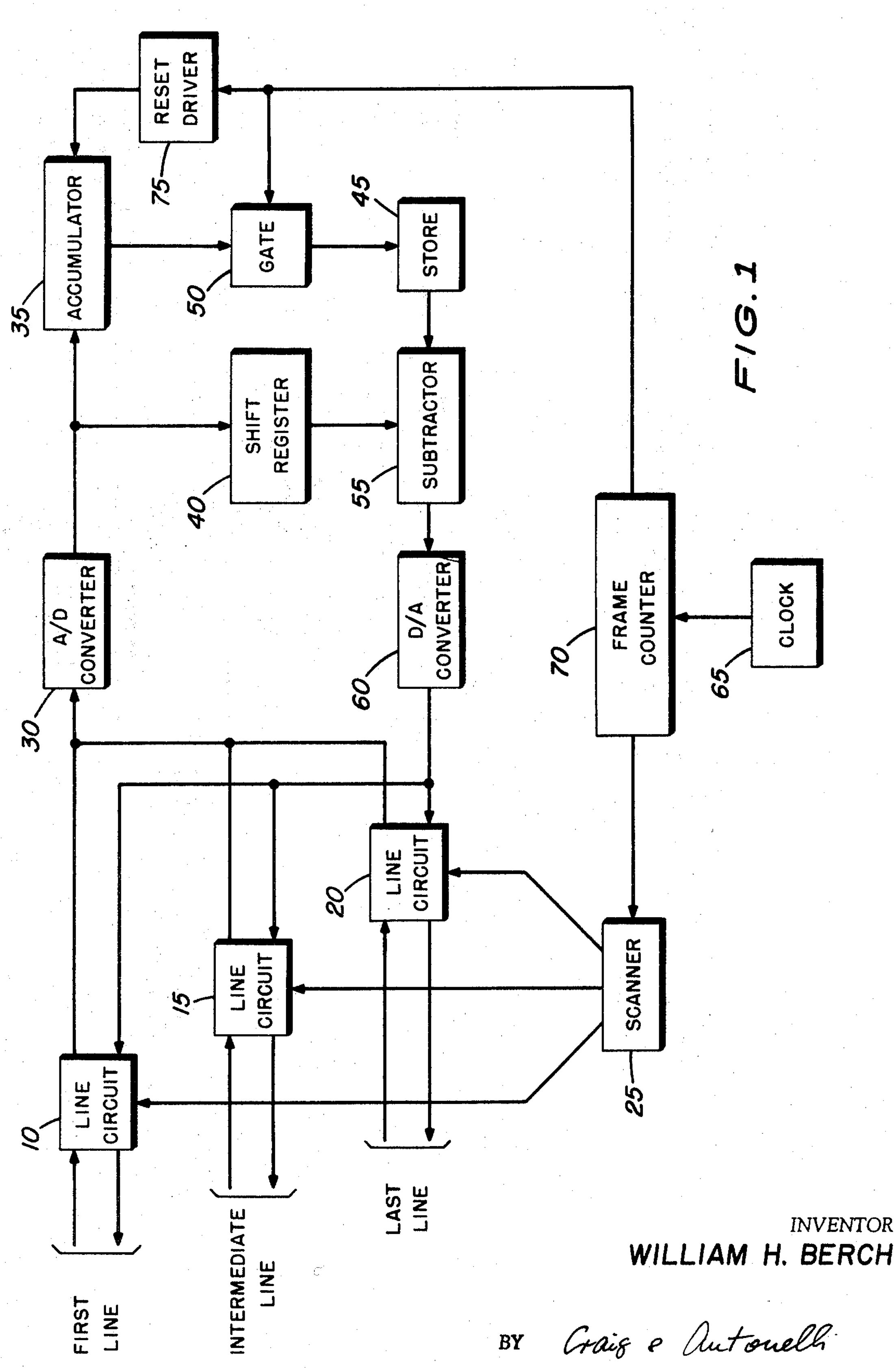

INVENTOR
WILLIAM H. BERCH

BY Craig & Antonelli
ATTORNEYS

INVENTOR
WILLIAM H. BERCH

BY Craig & Antonelli

ATTORNEYS

HIGH CAPACITY, HIGH SIDE-TONE SUPPRESSION, 4-WIRE CONFERENCE CIRCUIT

The present invention relates in general to communication systems and more particularly to a high capacity, high side tone suppression conference circuit for time division multiplex telephone communication systems.

One of the problems encountered in the design of time division multiplex communication systems is the provision of conference circuits of relatively simple configuration which are also capable of the high capacity handling of numerous parties without interference from side tones which are often generated in such conference circuits, and which contribute to a deterioration of the quality of the transmission to the point where the transmission may be considered unacceptable.

In prior art conference networks, in which a conference call is established through conventional telephone handsets at a telephone subscriber location, an inherent problem is created by sidetone coupling between the transmit and receive portions of a handset when employed in a conference call. The undesirable sidetone coupling occurs when a signal originating at the transmit portion of any subscribers subset, after amplification by the conference network, is returned to the receive portion of the same subscribers subset. If the amplification becomes sufficiently great, a singing effect is produced and communication is disrupted.

Conference call networks have been devised to reduce the sidetone coupling, but, in many instances, they have not proved entirely effective and have placed a limitation on the capacity of the network, due to the prohibitive expense of additional equipment required.

In accordance with the present invention a conference circuit for a time division multiplex system is provided wherein all of the analogue signals derived from conferee lines in repetitive time slots of a repetitive time frame are transformed into digital form, and by using conventional digital techniques, the digital values are summed into a composite information signal representing the total response received from the conferee lines during the repetitive time frame. Then, in accordance with the invention, the contribution from each conferee line is individually subtracted from the composite signal during the respective time slot of the following time frame and the resulting signals are then converted back to analogue form for application to the individual conferee lines in their respective time slots. As a result of the conversion from analogue to digital form, and subsequent reconversion from digital to analogue prior to application of the signals to the individual conferee lines, any side tone effect which may be created in the conference circuit attendant to the analogue signals therein will be completely suppressed. In addition, with the techniques provided by the present invention, a circuit using standard logic is capable of scanning a large number of lines, thereby providing by relatively simple means a conference circuit of high capacity.

In accordance with the present invention, each conference line is sequentially scanned and the analogue impulse voltage from each of the lines is sequentially converted into digital form and applied on the one hand to an accumulator which adds or subtracts, as required, the digital values received from each line, and on the other hand, the digital values are applied to a shift register which stores the absolute value of each line in the sequence received. At the end of a complete time frame, the data in the accumulator is transferred to a storage device and the accumulator repeats its function for the new time frame. During the subsequent time frame, the data from the shift register and that stored in the storage device is presented to a subtractor so that for each time slot of the time frame a value is received at the output of the subtractor equal to the composite value accumulated in the accumulator during the previous time frame less the digital value of the data received from the particular conference line occupying that time slot. The digital data received from the subtractor is reconverted into analogue form and applied to the line circuit occupying the particular time slot of the time frame.

It is an object of the present invention to provide a high capacity, high side tone suppression conference circuit which entirely eliminates or otherwise avoids the difficulties and disadvantages inherent in known systems of a similar nature.

It is another object of the present invention to provide a conference circuit of the type described which is capable of serving a large number of conference lines thereby providing for extremely high capacity. It is still another object of the present invention to provide a conference circuit of the type described wherein a high capacity may be attained by relatively simple means and further increase in capacity can also be made possible through relatively simple adaptations.

Figure 2:
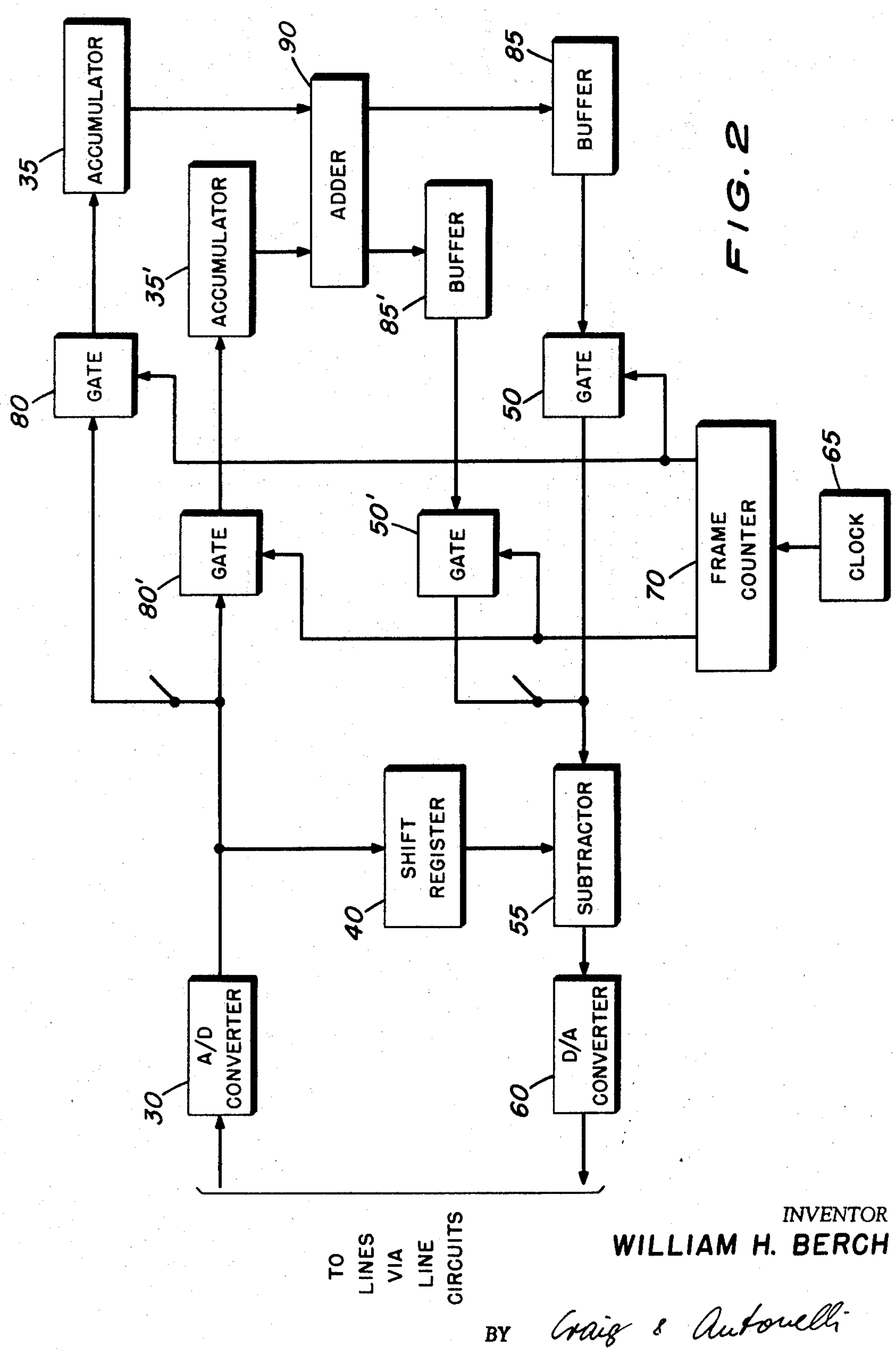

These and other objects, features and advantages of the present invention will become more apparent from the following detailed description of the invention, when taken in conjunction with the accompanying drawing, which illustrates one exemplary embodiment of the present invention, and wherein:

FIG. 1 is a schematic block diagram of the conference circuit in accordance with the present invention; and FIG. 2 is a schematic block diagram of a modification of the invention.

Looking now more particularly to the drawing, the conference circuit of the present invention is applicable primarily to conventional 4-wire switching systems as used in time division multiplex systems. As is well known, in time division multiplex systems, a scanning of the line circuits in sequential order is effected repeatedly for purposes of multiplexing a plurality of of individual communication signals. Such scanning is conventionally carried out by known timing arrangements which have been developed in various forms, any of which may be used with the present invention.

The conference circuit in accordance with the present invention may be associated with a plurality of line circuits, of which line circuit 10 may be the first line, line circuit 15 an intermediate line and line circuit 20 the last line of the line circuit group. A scanner 25 is connected to each of the line circuits and serves to scan the respective circuits in order so that each line circuit is actuated in its own respective time slot of the repetitive time frame. The individual subscriber data from each line is connected via an analogue-to-digital converter 30 on the one hand to an accumulator 35 and on the other hand to a shift register 40. The output of the accumulator 35 is connected to a storage device 45 through gate circuit 50, and the output of the storage device 45 is connected to a subtractor 55 along with the output of the shift register 40. The output of subtractor 55 is connected to a digital-to-analogue converter 60, which is connected in turn to each of the line circuits of the line circuit group.

The timing for the conference circuit is provided by a conventional clock 65 driving a frame counter 70. The frame counter provides synchronization for the scanning device 25 and also serves to actuate reset driver 75 connected to the accumulator 35, for resetting the latter device. The frame counter 70 is also connected to the gate circuit 50 for purposes of actuating that gate at the proper time.

In operation of the invention, each of the line circuits is sequentially scanned by the scanner 25 and an impulse voltage representing an instantaneous information signal is derived from the line circuits in the sequence scanned. These impulse voltages are presented to the analogue-to-digital converter 30 which digitizes the voltage impulse to a digital value. The output of the converter sequentially feeds digital information derived from the line circuits to the accumulator 35 and shift register 40. The accumulator adds, or subtracts, as required, the digital values of each line; while, the shift register stores the absolute value of each line as a separate bit of information in its own time slot of the repetitive time frame. At the end of each frame, as determined by the frame counter 70, after all of the line circuits have been scanned by the scanner 25, the gate 50 is actuated and the composite information representing the sum of all information signals derived from the line circuits at a given instant represented by the time frame is passed to the storage device 45. The reset driver 75 operated from the frame counter 70 resets the accumulator 35, which is then free for the subsequent frame.

During the subsequent frame, the accumulator repeats its function as for the first frame. At the same time, while each line circuit is being scanned, the absolute value derived from the given line circuit, as stored in the shift register 40, and the stored composite information signal in digital form stored in the storage device 45 are presented to the subtractor 55, the output of which provides the value that was in the storage device 45 less the contribution that was put in during the particular time slot of the time frame by the line circuit presently actuated. Thus, the digital-to-analogue converter 60 receives a digital value representing the voltage of the sum of all conferees obtained during the particular time slot assigned to a circuit less the contribution of that line circuit. The digital-to-analogue converter 60 then converts the digital value to analogue form, which is passed on to the line circuit.

The number of conferees or the capacity of the conference circuit as illustrated by the above-described embodiment depends primarily upon the timing used for the time division multiplex and the speed of the converters. Using typically 1 microsecond time slots and a repetition rate of 100 microseconds, 100 lines can be multiplexed to the converters and if the converter speeds are 1 microsecond, the circuit could serve as a 100 party conference. The same capacity can be achieved with lower speed converters by using a group of converters and sub multiplexing.

Additional capacity can also be accomplished with the same time division multiplex timing using two or more groups of the circuit of FIG. 1, as illustrated in FIG. 2. In this embodiment the groups having separate accumulators 35 and 35' are combined to form on conference by inclusion of an adder 90. The adder 90, common to all groups, sums the values sequentially of all accumulators 35 and 35' thus deriving a value which represents the conference sum for each group or all conferees. This value is then presented to the buffer or store 85 or 85' in each group and subsequently disseminated sequentially, after subtraction for side tone, to each conferee in the group with timing controlled by frame counter 70 under control of clock 65. Thus, the number of conferees for one conference would be 100 times the number of groups.

It should be recognized that greater than 100 lines can be multiplexed with shorter sampling intervals per line, a longer repetition rate and/or additional submultiplexing to provide a larger capacity per group. Thus, a very high capacity conference circuit can be provided by relatively simple means. In addition using the above described techniques, undesirable side tone is completely eliminated from the system due to the effect of the digital portion of the system.

In the circuit illustrated only one conference can be formed. With a modification, the circuit can serve as a multiconference application and/or a switching system.

In either application the modification consists of the inclusion of a plurality of accumulator-stores as provided in the embodiment of FIG. 2 along with a matrix and control in place of the frame counter 70 and clock 65, respectively. Each accumulator-store, with associated gate and reset drivers, provides, in part an independent conference means for all lines assigned to the accumulator-store. The matrix, interconnected between both the output of the A/D converter and input (minuend) of the subtractor and the accumulator-stores, provides for steering the data from the output of the A/D converter to any one of the accumulators and for steering the data from any one of the stores to the subtractor. The control provides for activating the matrix appropriately.

Operationally the system functions similarly to that previously described in connection with FIG. 2; the difference being that the data for each line is steered to and from the assigned accumulator-store combination instead of to one common accumulator-store. In this manner each accumulator-store combination provides an independent conference for those lines associated with the same group.

In effect each accumulator-store is a link and as a link the conference system can be used as a switching system. The number of independent, simultaneous communications that can be utilized with the described configuration depends upon the number of accumulator-stores with the maximum number being one-half the number of lines in the group. Thus with a typical system for 100 lines and using 50 accumulator-stores, the system could handle 50 independent 2-party conversations. The system could also provide conference whether for the entire 100 lines, by controlling the data for each line into the same accumulator-store, or for a plurality of 2-party or multiparty conferences.

I have shown and described one embodiment in accordance with the present invention. It is understood that the same is not limited thereto but is susceptible of numerous changes and modifications as known to a person skilled in the art and I therefore, do not wish to be limited to the details shown and described herein, but intend to cover all such changes and modifications as are encompassed by the scope of the appended claims.

I claim:

1. In a time division multiplex telephone communication system including a plurality of line circuits and timing means for actuating said line circuits in a respective time slot of a repetitive time frame, a high capacity, high side tone suppression conference circuit comprising:

first converter means connected to each line circuit for converting the outputs thereof to digital form;

signal control means connected to said first converter means for generating an information signal in each time slot of the repetitive time frame equal to the sum of all outputs during a previous time frame less the output of the line circuit, during said previous time frame, occupying the respective time slot; and second converter means connected to said signal control means and to each line circuit for converting each information signal from said signal control means into analogue form for application to said line circuits.

2. The combination defined in claim 1 wherein said first converter means is an analogue-to-digital converter and said second converter means is a digital-to-analogue converter.

3. The combination defined in claim 1 wherein said signal control means includes an accumulator connected to the output of said first converter means for summing the output of each line circuit during each time frame.

4. The combination defined in claim 3 wherein said signal control means further includes first storage means connected to the output of said first converter for storing the output of each line circuit in its respective time slot of the repetitive time frame.

5. The combination defined in claim 4 wherein said signal control means further includes second storage means for storing a signal and gate means responsive to said timing means for applying the contents of said accumulator to said second storage means at the end of each time frame.

6. The combination defined in claim 5 wherein said signal control means further includes subtractor means connected to said second storage means and said first storage means for subtracting during each time slot the signal stored in said first storage means in that time slot from the accumulated signal in said second storage means to provide said information signals.

7. The combination defined in claim 5 wherein said first storage means is a shift register.

8. The combination defined in claim 5 wherein said first storage means is a recirculating delay line.

9. The combination defined in claim 3 wherein said timing means includes reset driver means connected to said accumulator for resetting said accumulator to zero at the end of each time frame.

10. The combination defined in claim 3 further including an additional plurality of line circuits actuated by said timing means, third converter means connected to each of said additional line circuits for converting the outputs thereof to digital form, additional signal control means including an accumulator connected to said third converter means for generating an information signal in each time slot of the repetitive time frame equal to the sum of all outputs during a time frame less the output of the one line circuit of the additional line circuits occupying the respective time slot, and fourth converter means connected to said additional signal control means for converting each information signal therefrom to analogue form, the accumulators in said signal control means and said additional signal control means being connected to one another so that each sums the output of all line circuits.

11. The combination defined in claim 3 further including at least one additional plurality of line circuits actuated by said timing means, third converter means connected to said additional line circuits for converting the outputs thereof to digital form, additional signal control means including an accumulator for generating an information signal in each time slot of the repetitive time frame equal to the sum of all outputs applied thereto less the output of the one line occupying the respective time slot, and fourth converter means connected to said additional signal control means for converting each information signal therefrom to analogue form.

12. The combination defined in claim 11 wherein said signal control means and said additional signal control means include first gate means for selectively gating the output of said first and said third converter means to one of said accumulators and second gate means for gating the outputs of said accumulators to said second or fourth converter means depending upon from which of said first and third converter means the individual information signal was derived in a given time slot.